United States Patent [19]

Klippert et al.

[11] 4,143,224
[45] Mar. 6, 1979

[54] PROCESS FOR THE MANUFACTURE OF SUSPENSION POLYMERS OF VINYL CHLORIDE

[75] Inventors: Heinz Klippert; Ingolf Mielke, both of Burgkirchen, Alz; Otto Plewan, Neuötting, all of Fed. Rep. of Germany

[73] Assignee: Hoechst Aktiengesellschaft, Frankfurt am Main, Fed. Rep. of Germany

[21] Appl. No.: 878,230

[22] Filed: Feb. 16, 1978

[30] Foreign Application Priority Data

Feb. 19, 1977 [DE] Fed. Rep. of Germany ....... 2707259

[51] Int. Cl.$^2$ .............................................. C08F 14/06
[52] U.S. Cl. ............................... 526/200; 260/31.4 R; 260/31.6; 260/884; 526/344.2; 526/345
[58] Field of Search ............ 526/200, 344, 345, 344.2; 260/884

[56] References Cited

U.S. PATENT DOCUMENTS

| 2,538,051 | 1/1951 | Schick | 526/200 |
|---|---|---|---|
| 3,697,493 | 10/1972 | Meyer | 526/200 |
| 3,701,742 | 10/1972 | Richardson et al. | 526/200 |
| 3,806,478 | 4/1974 | Mansour et al. | 526/200 |

Primary Examiner—Harry Wong, Jr.
Attorney, Agent, or Firm—Connolly and Hutz

[57] ABSTRACT

Process for the manufacture of vinyl chloride polymers containing at least 50% by weight of polymerized vinyl chloride by polymerizing the monomer(s) in aqueous phase at 10 to 90° C. in the presence of an oil-soluble catalyst and 0.03 to 0.4 weight % of a mixture of suspending agents containing (a) a partly acetylated polyvinyl alcohol having 5 to 25 weight % acetate units
(b) at least one of the following compounds: methylcellulose; methyl-hydroxyethyl-cellulose; methylhydroxy-propyl-cellulose; hydroxyethyl-cellulose; hydroxypropyl-cellulose and
(c) a partly acetylated polyvinyl alcohol having 31 to 35 weight % of acetate units.

7 Claims, No Drawings

PROCESS FOR THE MANUFACTURE OF SUSPENSION POLYMERS OF VINYL CHLORIDE

The present invention relates to a process for the manufacture of vinyl chloride homopolymers, copolymers or graft copolymers in aqueous dispersion, in the presence of radical-forming, oil-soluble catalysts and a mixture of a cellulose ether, a partially acetylated polyvinyl alcohol containing from 5 to 25% by weight of acetate groups, and a partially acetylated polyvinyl alcohol containing from 31 to 35% by weight of acetate groups.

By "polymerization of vinyl chloride," there is to be understood hereinafter also the copolymerization and graft polymerization of vinyl chloride, and by "vinyl chloride polymers" likewise the vinyl chloride copolymers and graft polymers containing at least 50% by weight (relative to the total polymer) of polymerized vinyl chloride units.

The powdery polymer obtained after the polymerization of vinyl chloride in aqueous suspension with subsequent work-up and drying is generally processed without preliminary granulation. In the so-called soft processing, the powder is mixed with plasticizer, stabilizers, etc... in such a manner that a flowable powder is obtained. For this processing method, it is important that the PVC absorbs large amounts of plasticizer (up to 40%) as rapidly as possible. Rapid plasticizer uptake allows short cycle times in the mixer which, in the case of continuous operations, are of great economic importance. It is furthermore important for this kind of processing that the mixture has an apparent density as high as possible (which depends above all on the apparent density of the vinyl chloride polymer used), because it results in a high output rate of the processing machines.

A further important criterion for the quality of a vinyl chloride polymer is the grain size and grain size distribution thereof. Fine grains having a diameter of less than about $63\mu$ are undesirable, since they reduce the output of the processing machines and furthermore yield a dusty product of poor flow. On the other hand, coarse grains having a diameter of more than $250\mu$ should not be present either, because these grains are difficult to disintegrate and cause fish-eyes (also called specks or gels) in the final product. The grain size should be distributed in a rather narrow range and as far as possible not exceed the above limits.

On account of recent studies on physiologically noxious effects of monomeric vinyl chloride, it is furthermore desirable to remove the monomer as far as possible from the PVC grains obtained, which may be carried out according to known methods by treating either the aqueous suspension of the vinyl chloride polymer or the partially dehydrated or completely dry polymer. For short, the removal of the residual monomer(s) from the polymer is hereinafter called "degassing," and the property of the polymer to yield the residual monomer(s) is hereinafter called "degassing power" or "degassing behavior." Depending on the kind of manufacture, a vinyl chloride polymer may be degassed easily or with difficulty.

To sum up, it can be stated that a suspension PVC suitable for soft processing should have the following properties:
  high degassing power
  high porosity (plasticizer uptake more than 30% according to DIN 53417)
  high apparent density (more than 470 g/l according to DIN 53468)
  narrow grain size distribution (less than 3% smaller than $63\mu$ and less than 3% larger than $250\mu$)
  small amount of fish-eyes (less than 10 per 100 cm² of a rough sheet having a thickness of $200\mu$ after 20 minutes of processing on a two-roll-mill at 140° C.).

In the polymerization of vinyl chloride in aqueous suspension, the vinyl chloride is generally distributed in water with mechanical agitation and with addition of one or more suspension agents, and polymerized in the presence of oil-soluble catalysts. It is known from numerous published papers that the properties of the vinyl chloride polymer obtained are influenced by nature and amount of the suspension auxiliaries used in the polymerization.

Thus, German Auslegeschrift No. 1,720,328 describes a process for the manufacture of vinyl chloride polymers is aqueous suspension, according to which porous products having good flow properties in powder form and a low content of fish-eyes are obtained. In this process, there is used as suspension auxiliary a combination of polyvinyl alcohols or cellulose ethers having a viscosity of more than $20 \cdot 10^{-3}$ Pas (measured at 20° C. in a 4% aqueous solution) with a polyvinyl alcohol containing from 2 to 25% by weight of acetyl groups and having a viscosity of from 1 to $8 \cdot 10^{-3}$ Pas. As shown by Comparative Example A, which is a repetition of Example 1 of the above German Auslegeschrift No. 1,720,328, a product being easily degassed and having a high apparent density is obtained; however, its plasticizer uptake is poor and its content of fish-eyes too high. Moreover, this material has not the intended narrow grain size distribution, but contains 12% of coarse grains having a diameter of more than $250\mu$.

Furthermore, it results from Comparative Example D that the process claimed in the above German Auslegeschrift No. 1,720,328 gives coarse-grained products rich in fish-eyes when a hydroxyethyl cellulose is used as cellulose ether.

According to the process described in German Auslegeschrift No. 2,153,727, PVC polymers being highly porous and free from fish-eyes are said to be obtained by using a mixture of a methyl cellulose with a hydroxyethyl cellulose as suspension agent combination. However, the repetition of Example 1 of this patent application (see Comparative Test B) proves that this material, too, does not meet the actual requirements, that is, the plasticizer uptake does not attain that of the process of the invention as described below, the number of fish-eyes is higher, and the product obtained according to this method is of a too coarse grain.

A further process is disclosed in German Offenlegungsschrift No. 2,528,950, wherein a suspension agent combination is used comprising a mixture of a water-soluble methyl cellulose ether or a corresponding mixed ether together with a partially acetylated polyvinyl alcohol containing from 31 to 35% by weight, relative to the total substance, of acetate groups, that is, from 61.5 to 70.5% of residual acetate groups, relative to 100% by weight of the residual acetate content of the polyvinyl acetate and a viscosity of from 10 to 18 cm³/g, measured according to DIN 53728. The vinyl chloride polymer prepared according to this process (see Comparative Example C), has an improved plasticizer uptake as compared to the afore-described methods; however other disadvantages occur; the fish-eye content is relatively high, and the degassing power is insufficient.

It is the object of the present invention to provide a suspension auxiliary combination allowing the manufacture of vinyl chloride polymers of high apparent density, high plasticizer uptake, good degassing power and narrow grain size distribution which, on processing, show a minimum of fish-eyes.

In accordance with this invention, there is provided a process for the manufacture of polymers of copolymers of vinyl chloride containing at least 50% by weight of polymerized vinyl chloride units, by suspension polymerization of the monomer(s) in aqueous phase, at a temperature of from 10 to 90° C., in the presence of oil-soluble catalysts, comprising a total of from 0.03 to 0.4% by weight, relative to the monomer(s) used, of a suspension auxiliary mixture, which contains (a) from 0.01 to 0.1% by weight, relative to the monomer(s) used, of a partially acetylated polyvinyl alcohol having from 5 to 25% by weight of acetate groups and a viscosity of from 2 to $100 \cdot 10^{-3}$ Pas (measured on a 4% by weight aqueous solution at 20° C.);

(b) from 0.01 to 1.0% by weight, relative to the monomer(s) used, of at least one of the following cellulose ethers having a viscosity of from 5 to $500 \cdot 10^{-3}$ Pas (measured on a 2% by weight solution at 20° C.): methyl cellulose, methylhydroxyethyl cellulose or methylhydroxypropyl cellulose, the molar substitution degree of the methoxy group being about 1.4 to about 2.4, that of the hydroxyalkoxy group, if present, being from about 0.08 to about 0.28; or hydroxyethyl cellulose or hydroxypropyl cellulose the molar substitution degree of which being about 1 to about 3.5;

(c) from 0.01 to 0.2% by weight, relative to the monomer(s) used, of a partially acetylated polyvinyl alcohol having from 31 to 35% by weight of acetate groups and a viscosity of from 10 to 18 cm$^3$/g (measured according to German Industrial Standard DIN 53728 in methanol at 20° C., at a concentration of 10 g/l).

Instead of the suspension auxiliary (a) and also of (b) and/or (c), mixtures of suspension auxiliaries may be used alternatively. The amount of this mixture used instead of the suspension auxiliaries per se should, however, not exceed the corresponding ranges indicated for the individual suspension auxiliaries (a), (b) and (c), and the components of the mixture have to respect also the limits of the ranges indicated for the chemical composition, the acetate group content and the viscosity of the individual suspension auxiliaries (a), (b) and/or (c).

The suspension auxiliary mixture of components (a), (b) and (c) in accordance with this invention is added preferably before the start of the polymerization; the sequence of feeding the aqueous liquor and the monomer(s) to the polymerization vessel being free to chose. Alternatively, part of the suspension auxiliary mixture or its totality may be added after the start and, optionally, constantly during the polymerization, however, with the proviso that after a 25% monomer conversion at the latest the whole suspension auxiliary mixture should be present in the reaction mixture.

As suspension auxiliary (b) a hydroxyethyl cellulose or hydroxypropyl cellulose is preferably used.

The amount of the mixture of suspension auxiliaries (a) and (b) should be preferably from 0.03 to 0.15% by weight, especially from 0.05 to 0.1% by weight, relative to the monomer(s) used, and that of suspension auxiliary (c) preferably from 0.03 to 0.1% by weight, also relative to the monomer(s) used.

Suspension auxiliary (a) is preferably a partially acetylated polyvinyl alcohol containing from 15 to 25% by weight of acetate. The preferred viscosity range for suspension auxiliary (a) is from 5 to $50 \cdot 10^{-3}$ Pas (measured in a 4% by weight aqueous solution).

Outside of the quantity ranges of the individual suspension auxiliaries as indicated in the statement of invention, the intended combination of properties of the polymers prepared can be attained either not at all or involving considerable other disadvantages. Within the preferred ranges of quantity, acetate group content and viscosity as indicated, particularly good results are obained.

The molar substitution degree of the cellulose-alkyl or cellulose-alkyl-hydroxyalkyl ethers is calculated according to the following equation on the basis of the alkoxy, —OC$_2$H$_4$ or —OC$_3$H$_6$ groups in % by weight as determined by analysis:

$$MS = \frac{W\%(ana) \cdot 162}{M(ana)\left[100 - \Sigma W\%(ana)\frac{M(add)}{M(ana)}\right]}$$

M(ana) = molar weight of the analyzed group
M(add) = molar weight of the group added
W % (ana) = weight % content of the analyzed group
MS = molar substitution degree The molar substitution degree indicates the number of alkyl or hydroxyalkyl radicals present per dehydrated glucose unit.

The most favorable combination of properties of the vinyl chloride polymer with respect to apparent density, plasticizer uptake, grain size distribution, degassing power and fish-eyes can be obtained only when all 3 suspension agent components are used, as shown by Comparative Examples D to F. When the partially acetylated polyvinyl alcohol containing 31 to 35% by weight of acetate groups is omitted, the result is a high apparent density on the one hand; on the other hand, however, an unfavorably broad grain size distribution, a high content of fish-eyes and a plasticizer uptake just to be tolerated as sufficient (Comparative Example D).

When the partially acetylated polyvinyl alcohol containing 5 to 25% by weight of acetate is omitted in the polymerization formulation, a coarse product of low apparent density, insufficient plasticizer uptake, poor degassing power and very high fish-eye content is obtained (Comparative Example E).

When the cellulose derivative is omitted, a product is obtained the degassing power and plasticizer uptake properties are good, but the apparent density of which, at 430 g/l, is too low for the actual requirements, and the content of fish-eyes of which is too high (Comparative Test F). Comparative Tests E and F showing large amounts of fish-eyes prove that the combination of suspension auxiliaries in accordance with this invention is a synergistic mixture with respect to fish-eyes.

The plasticizer uptake (porosity) of the polymers prepared in accordance with this invention can be improved by adding one or more fatty acid esters of glycerol and/or sorbitol, such as glycerol monooleate, sorbitane monolaurate, -palmitate or -oleate. The hydroxy groups of these polyols which are not esterified with fatty acids may optionally be reacted with alkylene oxides having from 2 to 4 carbon atoms, especially ethylene oxide, one or more alkylene oxide groups per hydroxy group optionally participating in forming the compound. Preferably, from 0.01 to 1% by weight, especially 0.1 to 0.5% by weight, of these compounds, relative to the monomer(s), are used in the polymerization. No improving effect is observed at an amount below 0.01% by weight, while at amounts above 1% by weight the improving effect is maintained, but other disadvantages appear, such as increased cost and reduced quality of the product, for example by deposit formation (so-called "plate out") on machine parts or the final shaped articles during or after the thermoplastic processing of the polymer.

The preparation of vinyl chloride homopolymers, copolymers or graft copolymers according to this invention may be carried out in continuous or batchwise polymerization processes, with or without the use of a seed prepolymer, in aqueous suspension, in the presence of from 0.01 to 3% by weight, preferably 0.01 to 0.3% by weight, relative to the mononer(s), of radical-forming catalysts, for example diaryl, diacyl peroxides such as diacetyl, acetylbenzoyl, dilauroyl, dibenzoyl, bis-2,4-dichlorobenzoyl, bis-2-methylbenzoyl peroxide; dialkyl peroxides such as di-tert.-butylperoxide; peresters such as tert.-butylpercarbonate, tert.-butylperacetate, tert.-butylperoctoate, tert.-butylperpivalate; dialkylperoxydicarbonates such as diisopropyl-, diethylhexyl-, dicyclohexyl-, diethylcyclohexyl-peroxydicarbonates; mixed anhydrides of organic sulfoperacids and organic acids such as acetylcyclohexyl-sulfonylperoxide; azo compounds known as polymerization catalysts such as azo-isobutyric acid nitrile; furthermore optionally addition of persulfates such as potassium, sodium or ammonium persulfate; hydrogen peroxide, tert.-butylhydroperoxide or other water-soluble peroxides, as well as corresponding mixtures. Peroxidic catalysts may also be used in the presence of from 0.01 to 1% by weight, relative to the monomer(s), of one or more reducing substances suitable for forming a redox catalyst system, for example sulfites, bisulfites, dithionites, thiosulfates, aldehyde sulfoxylates, for sodium formaldehyde-sulfoxylate. Optionally, the polymerization may be carried out in the presence of from 0.01 to 1% by weight, relative to the monomer(s), of one or more nonionic emulsifiers, these emulsifiers being used either for the preliminary emulsification of the monomers or for the polymerization itself, in admixture with the above suspension agents.

Examples of nonionic emulsifiers are polyoxyethylene esters of fatty acids or polypropylene-oxide-/polyethylene-oxide condensation products.

Apart from the addition of catalysts, the suspension agent mixture of the invention and optionally emulsifiers, the polymerization may be carried out in the presence of buffer substances, for example alkali metal acetates, borax, alkali metal carbonates, ammonia or ammonium salts of carboxylic acids; or in the presence of molecule size regulators, for example aliphatic aldehydes having from 2 to 4 carbon atoms, chlorinated or brominated hydrocarbons such as di- and tri-chloroethylene, chloroform, bromoform, methylene chloride, or mercaptans.

Examples of further suitable polymerization auxiliaries can be found in H. Kainer, Polyvinylchlorid und Vinylchlorid-Mischpolymerisate, ed. 1965, pp. 13–34; Springer publishing Berlin/Heidelberg/New York.

The vinyl chloride homopolymers, copolymers or graft polymers according to the process of the invention should contain from 50 to about 100% by weight, preferably 80 to about 100% by weight and especially 90 to about 100% by weight (all indications relative to the polymer) of polymerized vinyl chloride units. "About 100% by weight of polymerized vinyl chloride units" means that a vinyl chloride homopolymer is present containing small amounts, for example 0,05 to 0,3 weight percent of water, residual amounts of polymerization auxiliaries and so on.

For the copolymerization with vinyl chloride, there are suitable for example one or more of the following monomers: olefins such as ethylene or propylene; vinyl esters of linear or branched carboxylic acids having from 2 to 20, preferably 2 to 4 carbon atoms such as vinyl acetate, vinyl propionate, vinyl butyrate, vinyl-2-ethylhexoate; vinyl-isotridecanoic acid esters; vinyl halides such as vinyl fluoride, vinylidene fluoride, vinylidene chloride; vinyl ethers; vinyl pyridine; unsaturated acids such as maleic, fumaric, acrylic, methacrylic acid and the mono- or diesters thereof with mono- or dialcohols having from 1 to 10 carbon atoms; maleic anhydride, maleimide and the N-substitution products thereof with aromatic, cycloaliphatic and aliphatic substituents, optionally branched, acrylonitrile; styrene.

For the graft copolymerization, there may be used for example elastomeric polymers obtained by polymerization of one or more of the following monomers: dienes such as butadiene, cyclopentadiene; olefins such as ethylene, propylene; styrene; unsaturated acids such as acrylic or methacrylic acid and the esters thereof with mono- or dialcohols having from 1 to 10 carbon atoms; acrylonitrile; vinyl compounds such as vinyl esters of linear or branched carboxylic acids having from 2 to 20, preferably 2 to 4 carbon atoms; vinyl halides such as vinyl chloride or vinylidene chloride, the vinyl halides, however, having been polymerized only together with at least one of the above monomers.

The polymerization is carried out at temperatures of from 10° to 90° C., preferably 30° to 80° C., and especially 45° to 75° C., above or below the vapor pressure of the monomer(s), optionally with refluxing, at two or more different agitation speeds and/or temperatures. The pH of the polymerization liquor should be from 2 to about 10.

During the polymerization, there may be added one or more of the following substances, optionally while maintaining constant the charge volume of the polymerization vessel: water, aqueous solutions, monomers, catalysts, cocatalysts, further polymerization auxiliaries such as chain transfer agents, buffer substances, emulsifiers, suspension agents.

The polymers prepared according to this invention can be freed from residual monomers, especially vinyl chloride, according to known methods in aqueous dispersion, in the form of a water-moist cake, or of a moist or dry powder.

The aqueous polymer dispersion is worked up to a dry powder according to known methods, too, for example by decanting the substantial amount of aqueous phase in a decanter centrifuge and drying the water-moist cake so obtained in a pneumatic conveying dryer or fluidized bed dryer. Powdery polymers so obtained may be subjected to thermoplastic processing like hitherto usual suspension polymers of vinyl chloride, for example to extrusion, injection molding or calendering.

The favorable property combination of the polymers prepared in accordance with this invention with respect to apparent density, plasticizer uptake, grain size distribution and reduced tendency to formation of fish-eyes (specks or gels) allows to use the polymers especially for those manufacturing operations which are to produce high-quality, particularly transparent and optically perfect shaped articles at high yield. The property of being easily degassed allows an economic and physiologically unobjectionable manufacture of the polymers in accordance with the invention, their physiologically unobjectionable further processing and use of the shaped articles made therefrom.

The values indicated in the following Examples and Comparative Tests are determined as follows:

Residual VC monomer content: by gas chromatography according to the head-space method (Zeitschrift fur Analytische Chemie, 255 (1971), pp. 345–350)

Apparent density: according to German Industrial Standard DIN 53 468

Plasticizer uptake: according to German Industrial Standard DIN 53 417

Grain size distribution: according to German Industrial Standard DIN 53 734

The number of fish-eyes was measured as follows:

| | |
|---|---|
| 210 g vinyl chloride polymer | |
| 84 g di-2-ethylhexyl phthalate | |
| 3 g titanium dioxide (Rutil type) | |
| 3 g barium-cadmium-laurate (stab. BC 12; Ciba Geigy) | as ground paste |
| 5,7 g di-2-ethylhexyl phthalate | |
| 0,3 g phthalocyamine blue (Heliogenblau 6902 K; BASF) | | are thoroughly mixed.

At a roller temperature of 140° C., a rough sheet is manufactured from this paste which is removed after 20 minutes at a thickness of 200μ. The sheet is clamped over a lamp, and the unpigmented particles in an area of 100 cm² are counted.

In the following Examples and Comparative Tests, the parts and percentages are by weight unless otherwise stated.

EXAMPLE 1

There are introduced into a polymerization vessel provided with double jacket for temperature control and agitator:
190 000 parts of water
51 parts of water a partially acetylated polyvinyl alcohol (PVA) containing 22% of acetate and having a viscosity of $5 \cdot 10^{-3}$ Pas (4% by weight aqueous solution at 20° C.)
33 parts of water hydroxyethyl cellulose (HEC) having a molar substitution degree MS of 1.5 to 1.8 and a viscosity of $18 \cdot 10^{-3}$ Pas (2% by weight aqueous solution at 20° C.)
92 parts of water partially acetylated PVA containing 33% of acetate and having a viscosity of 15 cm³/g (measured according to DIN 53 728 in methanol, at a concentration of 10 g/l)
40 parts of water of di-(2-ethylhexyl)peroxydicarbonate (65% strength in aliphatic substance)

The air in the vessel is driven out by means of nitrogen with agitation of the liquid, and subsequently, 132 000 parts of vinyl chloride (VC) are added. The mixture is heated to 53° C., and polymerized at this temperature until the pressure has dropped to 3.92 bars. The polymerization vessel is then depressurized to atmospheric pressure and evacuated, and subsequently cooled. 1 Liter each of the polymerization dispersion is removed twice. One of these portions of 1 liter is introduced into a 2 liter glass flask, heated to 80° C., and, while maintaining this temperature with agitation under a pressure of 480 mbars, 6% of water, relative to the dispersion, are evaporated within 50 minutes. The amount of evaporated water is determined by condensation in a trap. Every 10 minutes, samples are taken from the suspension, filtered, and the residual vinyl chloride content of the polymer cake containing 20% of water is determined by gas chromatography.

The second liter of dispersion taken from the polymerization vessel is filtered at once (without the heat treatment at 80° C. as described above), and the residual vinyl chloride content of the polymer cake containing 20% by weight of water is determined by gas chromatography.

The remaining contents of the vessel are filtered and dried. Further tests are carried out on the PVC powder so obtained. For a better survey, the results obtained are listed in the Table.

EXAMPLE 2

According to Example 1, there are used, polymerized and worked up:
193 000 parts of water
50 parts of water a partially acetylated polyvinyl alcohol (PVA) containing 20% of acetate groups and having a viscosity of $10 \cdot 10^{-3}$ Pas (4% aqueous solution at 20° C.)
39 parts of water a hydroxylpropyl cellulose having a molar substitution degree of 3 hydroxypropyl groups per glucose unit, and a viscosity of $25 \cdot 10^{-3}$ Pas (2% aqueous solution at 20° C.)
92 parts of water the partially acetylated polyvinyl alcohol containing 33% of acetate groups as described in Example 1
14 parts of water dilauryl peroxide
55 parts of water di-(2-ethylhexyl)peroxydicarbonate (65% strength in aliphatic substance)
110 000 parts of water of vinyl chloride. Results see Table.

COMPARATIVE EXAMPLE A

Operations were carried out according to Example 1 of German Auslegeschrift No. 1,720,328. The following batch was used:
211 000 parts of water
66 parts of water the PVA containing 22% acetate groups as described in Example 1
22 parts of water methylhydroxypropyl cellulose, methoxy content 29%, hydroxypropyl content about 6%, viscosity of the 2% aqueous solution at 20° C. = $50 \cdot 10^{-3}$ Pas
36 parts of water ammonium hydrogen carbonate
198 parts of water dilauryl peroxide
110 000 parts of water vinyl chloride. Results see Table.

COMPARATIVE EXAMPLE B

Operations were carried out according to Example 1 of German Auslegeschrift No. 2,153,727. The following batch was used:
200 000 parts of water
32 parts of the methylhydroxypropyl cellulose as described in Comparative Example A
23 parts of the hydroxyethyl cellulose, 1.9 equivalents of ethylene oxide bound per glucose unit, viscosity of the 2% aqueous solution at 20° C. = $300 \cdot 10^{-3}$ Pas.
9 parts of the sodium hydrogen carbonate 262 parts of the dilauryl peroxide
119 000 parts of the vinyl chloride. Results see Table.

COMPARATIVE EXAMPLE C

Operations were carried out according to Example 1 of German Offenlegungsschrift No. 2,528,950. The following batch was used:

200 000 parts of water
83 parts of water the methylhydroxypropyl cellulose as described in Comparative Example A
60 parts of water the PVA containing 33% of acetate as described in Example 1
48 parts of water ammonium hydrogen carbonate
83 parts of water dilauryl peroxide
48 parts of water dicetylperoxy-dicarbonate
119 000 parts of water vinyl chloride. Results see Table.

COMPARATIVE TEST D

According to Example 1, there were used, polymerized and worked up:
210 000 parts of water
44 parts of the partially acetylated polyvinyl alcohol containing 22% of acetate groups and having a viscosity of $5 \cdot 10^{-3}$ Pas as described in Example 1
44 parts of the hydroxyethyl cellulose as described in Example 1
40 parts of di-(2-ethylhexyl)peroxydicarbonate (60% strength in phthalate)
110 000 parts of vinyl chloride.

The product consisted in part of coarse grit and lump-like agglomerations. Results see Table.

COMPARATIVE TEST E

According to Example 1, there are used, polymerized and worked up:
175 000 parts of water
66 parts of a hydroxyethyl cellulose having a molar substitution degree MS of 1.8 to 2.2 hydroxyethyl groups, and a viscosity of $11 \cdot 10^{-3}$ Pas (2% aqueous solution at 20° C.)
92 parts of the PVA containing 33% of acetate groups as described in Example 1
66 parts of 6-amylperneodecanoate (25% strength in aliphatic substance)
132 000 parts of vinyl chloride. Results see Table.

COMPARATIVE TEST F

According to Example 1, there were used, polymerized and worked up:
175 000 parts of water
92 parts of the partially acetylated polyvinyl alcohol having 22% of acetate groups as described in Example 1
92 parts of the partially acetylated polyvinyl alcohol containing 33% of acetate groups as described in Example 1
40 parts of di-(2-ethylhexyl)peroxydicarbonate (65% strength in aliphatic substance)
132 000 parts of vinyl chloride. Results see Table.

| | Apparent density (g/l) | Plasticizer uptake (%) | Grain size distribution 250 μ wt. % | 63 μ wt. % | Fish-eyes (/100 cm$^2$) | Vinylchloride * degassing blank value | after 20 minutes |
|---|---|---|---|---|---|---|---|
| Example 1 | 470 | 34 | 0 | 1 | 3 | 7200 | 2 |
| Example 2 | 480 | 32 | 1 | 0 | 5 | 6600 | 8 |
| Comparative Example A | 465 | 26 | 12 | 3 | 20 | 9800 | 6 |
| Comparative Example B | 485 | 26 | 90 | 0 | 16 | 6700 | 5 |
| Comparative Example C | 465 | 34 | 5 | 6 | 15 | 4700 | 24 |
| Comparative Example D | 490 | 30 | 97 | 0 | 24 | 7500 | 15 |
| Comparative Example E | 420 | 27 | 19 | 0 | 600 | 7300 | 78 |
| Comparative Example F | 430 | 38 | 1 | 0 | 30 | 7600 | 1 |

*Indication in parts by weight of monomer vinyl chloride in 1 000 000 parts by weight of moist polymer containing 20% by weight of water

What is claimed is:

1. A process for the manufacture of polymers of vinyl chloride containing at least 50% by weight of polymerized vinyl chloride units, by suspension polymerization of the monomer(s) in aqueous phase, at a temperature of from 10° to 90° C., in the presence of oil-soluble catalysts, comprising a total of from 0.03 to 0.4% by weight, relative to the monomer(s) used, of a suspension auxiliary mixture, which contains
    (a) from 0.01 to 0.1% by weight, relative to the monomer(s) used, of a partially acetylated polyvinyl alcohol having from 5 to 25% by weight of acetate groups and a viscosity of from 2 to $100 \cdot 10^{-3}$ Pas (measured on a 4% by weight aqueous solution at 20° C.);
    (b) from 0.01 to 0.1% by weight, relative to the monomer(s) used, of at least one of the following cellulose ethers having a viscosity of from 5 to $500 \cdot 10^{-3}$ Pas (measured on a 2% by weight solution at 20° C.): methyl cellulose, methylhydroxyethyl cellulose or methylhydroxypropyl cellulose, the molar substitution degree of the methoxy group being about 1.4 to about 2.4, that of the hydroxyalkoxy group, if present, being from about 0.08 to about 0.28; or hydroxyethyl cellulose or hydroxypropyl cellulose the molar substitution degree of which being about 1 to about 3.5;
    (c) from 0.01 to 0.2% by weight, relative to the monomer(s) used, of a partially acetylated polyvinyl alcohol having from 31 to 35% by weight of acetate groups and a viscosity of from 10 to 18 cm$^3$/g (measured according to German Industrial Standard DIN 53 728 in methanol at 20° C., at a concentration of 10 g/l).

2. The process as claimed in claim 1, which comprises using as component (b) of the suspension auxiliary mixture a hydroxyethyl cellulose or a hydroxypropyl cellulose.

3. The process as claimed in any one of claims 1 or 2, wherein the sum of the amounts of suspension auxiliaries (a) and (b) is from 0.03 to 0.15% by weight, relative to the monomer(s) used.

4. The process as claimed in any one of claims 1 or 2, which comprises using from 0.03 to 0.1% by weight, relative to the monomer(s) used, of suspension auxiliary (c).

5. The process as claimed in any one of claims 1 or 2, which comprises using a partially acetylated polyvinyl alcohol containing from 15 to 25% by weight of acetate groups as suspension auxiliary (a).

6. The process as claimed in any one of claims 1 or 2, which comprises using a partially acetylated polyvinyl alcohol having a viscosity of from 5 to 50 · $10^{-3}$ Pas (measured on a 4% by weight aqueous solution at 20° C.) as suspension auxiliary (a).

7. The process as claimed in any one of claims 1 or 2, which comprises preparing a polymer of vinyl chloride containing from 80 to 100% by weight of polymerized vinyl chloride units.

* * * * *